United States Patent [19]

Chesney, Jr. et al.

[11] 4,418,166

[45] Nov. 29, 1983

[54] HIGH TEMPERATURE RESISTANT ADHESIVE BONDING COMPOSITION OF EPOXY RESIN AND TWO-PART HARDENER

[75] Inventors: Joseph J. Chesney, Jr., Plainsboro; Robert E. Schaefer, Hillsdale, both of N.J.

[73] Assignee: Tile Council of America, Inc., Princeton, N.J.

[21] Appl. No.: 283,133

[22] Filed: Jul. 14, 1981

[51] Int. Cl.$^3$ .............................. C09J 3/14; C09J 3/16
[52] U.S. Cl. .................................. 523/400; 52/309.3; 52/389; 52/390; 156/330; 524/906
[58] Field of Search .......... 260/18 PN, 37 EP, 42.28; 52/309.3, 389, 390; 156/330; 523/400; 524/906

[56] References Cited

U.S. PATENT DOCUMENTS

| | | | |
|---|---|---|---|
| 3,140,566 | 7/1964 | Wagner | 156/330 |
| 3,183,198 | 5/1965 | Wagner | 260/18 PN |
| 3,212,946 | 10/1965 | Weller et al. | 156/330 |
| 3,242,116 | 3/1966 | Becker et al. | 156/330 |
| 3,268,561 | 8/1966 | Peppel et al. | 260/18 EP |
| 3,311,515 | 3/1967 | Weller et al. | 156/71 |
| 3,348,988 | 10/1967 | Wagner et al. | 156/71 |
| 3,396,138 | 8/1968 | Weller | 260/37 EP |
| 3,396,140 | 8/1968 | Weller | 260/37 EP |
| 3,420,794 | 1/1969 | May et al. | 156/330 |
| 3,683,044 | 8/1972 | Huang et al. | 156/330 |
| 4,076,869 | 2/1978 | Flynn | 156/330 |
| 4,308,183 | 12/1981 | Williams | 524/906 |

OTHER PUBLICATIONS

Concrete Products, Mar., 1968, article entitled Monowall & Threadline: Block's Two-Fisted Marketing Punch; 5 pages.

*Primary Examiner*—Ronald W. Griffin
*Attorney, Agent, or Firm*—Morgan, Finnegan, Pine, Foley & Lee

[57] ABSTRACT

A solventless, cross-linked adhesive bonding composition composed of a resin base portion comprised of an epoxy resinous material containing terminal epoxy groups and being essentially free from units derived from vegetable oils and aliphatic ethers, and a filled hardener portion containing a mixture of a modified polyamine and polyamido-amine.

12 Claims, No Drawings

HIGH TEMPERATURE RESISTANT ADHESIVE BONDING COMPOSITION OF EPOXY RESIN AND TWO-PART HARDENER

FIELD OF THE INVENTION

This invention relates to epoxy resin compositions. More particularly, the invention relates to epoxy resin compositions having resistance to temperatures up to 350° F. Most particularly, the present invention relates to high temperature resistant epoxy resins which are particularly suitable for setting and grouting tile.

DESCRIPTION OF THE PRIOR ART

At present, the mortar and grout for setting and grouting tile is comprised of Portland cement based materials and various chemical adhesive materials.

One of the adhesives used to set and grout tile is an epoxy resin. U.S. Pat. No. 3,183,198 (Wagner; May 11, 1965) describes an epoxy resin developed by Tile Council of America which has many advantages over prior epoxy resins. The epoxy resin of the Wagner patent is a two-part adhesive bonding composition comprised of epoxy resin and a hardener of either polyamine or polyamido-amine. These epoxy based adhesives are compatible with water and are easily washed from the tile surface if inadvertently applied to the tile. Further, the epoxy adhesives have good chemical resistance. However, the epoxy resins developed by Wagner are not resistant to high temperatures. In commerce the epoxy resins are identified as AAR-II.

SUMMARY OF THE INVENTION

Thus, it is an object of this invention to maintain the desirable characteristics of the epoxy adhesive developed previously by Tile Council of America and to provide improved heat resistance properties.

It is another object of the invention to provide polyepoxide resin compositions having satisfactory resistance to deterioration when exposed to a chemical environment, especially organic acids, at elevated temperatures.

It is another object of the present invention to provide epoxy resin adhesive compositions which cure in the presence of water and which, in addition, will yield high temperature resistant properties.

It is a further object of the present invention to provide an epoxy resin adhesive composition which is water cleanable from the tile face before an initial gel occurs.

Another and further object of the present invention is to provide an epoxy resin adhesive composition which cures at room temperature and demonstrates excellent chemical and physical properties at elevated temperatures.

A still further object of the present invention is to provide a room temperature cured epoxy resin adhesive composition which can set ceramic tile on a horizontal or vertical surface without sagging or sliding and which will have excellent chemical and physical properties at elevated temperatures.

Thus, the composition of the present invention is an epoxy resin which has been cured with a modified polyamine in combination with a polyamido-amine. The modified polyamine is one which is the reaction product of an aliphatic polyamine and a compound selected from the group consisting of aliphatic and aromatic mono and diepoxides, mono and dihydric phenols, aldehydes, nitriles and mixtures of any of the foregoing. The polyamido-amine is the reaction product of an aliphatic polyamine and a polycarboxylic acid.

SPECIFIC DESCRIPTION OF THE INVENTION

According to the present invention there are provided high temperature resistant curable epoxide compositions cured with unique useful and novel curing agents.

The preferred polyepoxides are those formed by reacting epichlorohydrin with 4, 4 isopropylidene diphenol and having a molecular weight ranging from about 340 to about 10,000. Most preferably, the polyepoxides have a molecular weight range from about 330 to 560 and contain at least two oxirane groups; i.e., two epoxy groups

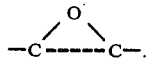

This difunctional resin may be saturated or unsaturated, cycloaliphatic, allylcyclic or heterocyclic and may be substituted with substituents such as, halide atoms, hydroxyl groups, ether radicals and the like. They may also be trifunctional or polyfunctional. Polyepoxides that are not desirable in the invention are epoxidized oils such as castor oil, and aliphatic ether epoxides.

Reactive diluents suitable for use in the present invention are many times referred to as monomers. These are products of epichlorohydrin and various aliphatic and aromatic polyethers and may be either monofunctional or difunctional. Non-reactive diluents, sometimes referred to as plasticizers, may also be used.

The aliphatic polyamines suitable for the formation of the modified polyamine of the present invention have the formula:

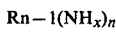

where $x=0-2$ and $n=2-7$ and R is a hydrocarbon radical which may have up to 60 carbon atoms. Preferably, the hydrocarbon radical should have fewer than about 30 carbon atoms and more than 3 carbon atoms. Especially suitable are aliphatic polyamines which have an n value of at least 4 and or a molecular weight of at least 90.

Examples of aliphatic polyamines are ethylene diamine, propylene diamine, diethylene triamine, dipropylene triamine, triethylene tetramine, tripropylene tetramine, tetraethylene pentamine, tetrapropylene pentamine and combinations thereof.

The modified polyamines suitable for the present invention are products of the aforementioned aliphatic polyamines and the like reacted together with substituents capable of reacting with the reactive hydrogen of the amine group and have the general formula of:

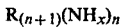

where $n=2-7$ and $x=1-2$

Illustrative of the modified polyamines is the commercial product EPOTUF 37-622 of Reichhold Chemicals Co.

Examples of these reactive substituents that may be used are aliphatic and aromatic di and monoepoxides, Nonyl and Diphenols, formaldehyde, paraformaldehyde, acrylonitrile and the like.

The polyamido-amine suitable for the present invention is a copolymerization of an aliphatic polyamine and polycarboxylic acids. It is important that an excess of polyamine is present in the resulting product.

Again the aliphatic polyamines suitable for formation of the polyamido-amine have the formula:

$$R_n-1(NH_x)_n$$

where $x=0-2$ and $n=2-7$ and R is a hydrocarbon radical which may have up to 60 carbon atoms. Preferably, the hydrocarbon radical should have fewer than about 30 carbon atoms and more than 3 carbon atoms. Especially suitable are aliphatic polyamines which have an n value of at least 4 and or a molecular weight of at least 90.

Examples of aliphatic polyamines are ethylene diamine, propylene diamine, diethylene triamine, dipropylene triamine, triethylene tetramine, tripropylene tetramine, tetraethylene pentamine, tetrapropylene pentamine and combinations thereof.

Polycarboxylic acids suitable for reaction with above mentioned aliphatic polyamines should have at least two carboxyl groups and the formula:

$$R(COOH)_n$$

wherein n is at least 2 and wherein R is a hydrocarbon radical which may be saturated or unsaturated, aliphatic, aromatic, cycloaliphatic or heterocyclic.

Examples of suitable polycarboxylic acids are; adipic, pimelic, suberic, azelaic, sebocic, nonore dicarboxylic acids and the higher members of this series and including mixtures thereof.

Especially suitable for use are the resin acids. These are characterized as diterpene acids, a major constituent being abietic acid. When such diterpene acids are dimerized, a dicarboxylic acid results. Particularly useful are those diterpenes which upon being dimerized, have a molecular weight of about 300 to 900 and preferably between 500-600.

An illustration of a suitable polyamido-amine is the commercial product EPOTUF 37-620 of Reichhold Chemicals Co.

To produce the adhesive composition of this invention it is necessary only to mix together a polyepoxide and the coreactant hardeners described previously. The amount of hardener mixed with the polyepoxide may vary greatly. In general, it will vary from about 6 to 140 percent by weight of the epoxide resin, with a preferred range being from about 18 to 70 percent by weight of the epoxide resin.

However, the epoxy resin composition operating most beneficially under this invention is one in which the resin and hardener are stoichiometrically balanced. Example VII herein illustrates this ideal system.

The invention will be more readily understood by reference to the accompanying specific examples which are intended as illustrative rather than as limiting the invention except as defined in the accompanying claims.

EXAMPLE I 100 parts by weight of an epoxide polymer of the digycidylether of a Bisphenol acetone type, having a viscosity of about 12,000 cps (25° C.), an epoxide equivalent of about 190 and a molecular weight of 380 with a melting point range of 8° to 12° C. was mixed with 25 parts by weight of a modified polyamine at room temperature and allowed to react to form a cross-linked copolymer.

The modified polyamine is a product of an aliphatic polyamine and phenol in the presence of water. It has a viscosity of about 400 cps (25° C.) and molecular weight per active hydrogen of 50.

The resulting cross-linked polymer composition was evaluated in various elevated temperature ambients. It was found that the composition retained its hardness, physical, chemical and bonding or adhesive strength with tiles at temperature up to and including 125° C.

Furthermore the adhesive composition was effectively cured in the presence of water and was capable of being removed from the surface of the tile using a damp cloth prior to final gelation.

EXAMPLE II

Following the procedure of Example I and using the same epoxy resin as in Example I, it was mixed with a stoichiometric amount of triethylene tetramine. Curing of the composition was performed under the same controls.

The resulting cross-linked polymer did not cure well in the presence of water, would only partially wash from a tile with a damp cloth before final gelation and did not maintain its physical, chemical or hardness properties at elevated ambient temperatures as low as 55° C. and thus did not perform as the adhesives of the invention.

EXAMPLE III

Example I was repeated except this time the hardener was a polyamido-amine which was a product of the copolymerization of an aliphatic polyamine and a dimerized fatty acid. It was mixed with the same diglycidylether of a Bisphenol acetone type epoxy resin at a ratio of 100 parts by weight of resin to 51.6 parts by weight of the polyamido-amine.

The polyamido-amine had a viscosity of approximately 15,000 cps (25° C.), and an amine value of about 300.

The resulting composition had excellent washability before final gellation, cured completely in the presence of water, had excellent bonding and adhesive qualities to tile edges and backing. However, at elevated temperatures its hardness, physical and chemical properties diminished.

EXAMPLE IV

Example III was repeated except that a portion of the hardener was a low viscosity modified polyamine. Its viscosity is about 100 cps at 25° C. and has a weight per active Hydrogen of about 34-38.

It was coreacted with the same diglycidylether of a Bisphenol acetone epoxy resin at a ratio of 100 parts by weight to 44.5 parts by weight of the hardener mixture.

The polyamido-amine-modified polyamine blend was at a ratio of 50% of each based on stoichiometry.

The resulting cured product had improved high temperature, chemical and physical properties over the product of Example III. It had excellent bonding and adhesive characteristics, was washable before final gellation and its cure was not inhibited by the presence of water.

EXAMPLE V

Example I was repeated except a portion of the hardener was replaced with a low viscosity polyamido-amine.

The polyamido-amine has a viscosity of about 600 cps at 25° C. and amine value of about 435.

The hardener ratio blend was again 50% of each based on stoichiometry and was co-reacted with the same resin used in Example I and at a ratio of 100 parts by weight of resin to 32.5 parts by weight of hardener blend.

The resulting composition maintained its chemical, physical and adhesive bonding properties in elevated temperature ambients up to and including 145° C.

In addition, it cured completely in the presence of moisture and was easily wipeable before final gellation, from a tile face using a damp cloth.

EXAMPLE VI

Example V was repeated replacing the hi-viscosity modified polyamine from Example I with the low viscosity modified polyamine from Example IV.

The hardener ratio was again 50% of each based on stoichiometry.

It was coreacted with the same resin used in Example I through V at a ratio of 100 parts by weight of resin to 30 parts by weight of the hardener blend.

The cross-linked polymer that developed had excellent chemical, physical and adhesive bonding strength to ceramic tile and other substrates at elevated temperature ambients up to 130° C.

Furthermore, it cured well in the presence of moisture and was easily removed from the face of ceramic tile, before final gelation, using a damp cloth.

Because of their demonstrated superior properties at elevated temperature ambients the compositions of Examples V and VI were further compounded into tile setting and grouting compositions.

As aforementioned diluents both reactive and nonreactive may be used as well as fillers, extenders, colorants and other resinous materials.

Examples of pigments and fillers that may be used are blanc fixe, various clays, silicas, talcs, pyrophyllite, and other finely divided like materials.

If desired, the epoxy resins can be compounded with other resins, such as polyimides, polyester resins, thermoplastic resins, polystyrene resins and so forth to increase flexibility, green strength and other properties desired of the uncured or hardened composition.

Coloring material may be added to the adhesive compositions if desired. The colorants can be either organic or inorganic. However those carbons must be stable at elevated temperatures up to and including 150° C. Examples are, titanium dioxide, carbon black, antimony oxide, chrome yellow, cadmium red and iron oxides.

The adhesive compositions of the present invention may also have incorporated, if desired, a lubricant, such as silicone oils, silicone jelly, petroleum jellies, and so forth.

The following example is illustrative of a bonding composition, for setting and grouting ceramic tiles, using the epoxy resins and hardeners of the present invention.

EXAMPLE VII

A resin base and a filled hardening composition were prepared using the following formulation.

Resin base:

| | |
|---|---|
| 77.0 weight parts | epoxide resin - Reichhold Chemicals EPOTUF 37-140 |
| 9.0 weight parts | reactive diluent Proctor & Gamble Exoxide #8 (aliphatic monoglycidic ether) |
| 10.0 weight parts | polystyrene resin - Picolastic A-5 |
| 4.0 weight parts | fumed silica Cab-O-Sil | filled-Hardener composition:

| | |
|---|---|
| 8.7 weight parts | modified polyamine Reichhold Chemicals EPOTUF 37-622 |
| 21.3 weight parts | polyamido-amine Reichhold Chemicals EPOTUF 37-620. |
| 268.8 | silica |
| 0.9 | glycerine |
| 0.3 | carbon black |

The epoxide resin used was a digycidylether of a bisphenol acetone type described in Example I. The hardener blend was that used in and described in Example VI.

The resin base and filled hardener composition were mixed and a smooth, black easily spreadable composition was obtained. The composition produced was trowelled on both vertical and horizontal substrates and set ceramic tile. Subsequently, the joints between the tiles set on both the vertical and horizontal surfaces were filled with the same material. Excess material was removed from the tile face by wiping with a damp cloth.

A hard, adherent, chemically and physically resistant joint and base was obtained. Furthermore the joint and base material remained the same even when heated to 150° C.

A comparison of the epoxy adhesive mortar of Example VII and the commercial AAR-II shows the superior heat resistant properties of the Example VII epoxy adhesive mortar as follows:

| | Shore D hardness values (after 2 hr. in oven; measured 60 sec after removed from the oven) | |
|---|---|---|
| Temperature | AAR-II | EXAMPLE VII |
| 50° C. | 58 | 85 |
| 75° C. | 30 | 67 |
| 100° C. | 21 | 52 |
| 125° C. | 13.5 | 42.5 |
| 150° C. | 11 | 37.5 |
| 175° C. | 8.5 | 32.5 |

Further, on testing the respective epoxy adhesive mortars for a two day cure it was found that the AAR-II lost the ability to form a hard uniform bond while the Example VII mortar formed a heat elastic bond. The Shore D hardness values at room temperature after the two day cure were respectively: AAR-II-55; Example VII 90.

What is claimed:

1. A solventless, cross-linked adhesive bonding composition which cures and/or gels in the presence of water comprising a resin base portion and a filled hardener portion; said resin base portion comprising an epoxy resinous material containing terminal epoxy groups and being essentially free from units derived from vegetable oils and aliphatic ethers; said filler hardener portion comprising the combination of a modified polyamine and polyamido-amine, said modified polyamine is comprised of the reaction product of an aliphatic polyamine and a compound selected from the group consisting of aliphatic and aromatic mono and di epoxides, mono and dihydric phenols, aldehydes, nitriles and mixtures of any of the foregoing.

2. The adhesive bonding composition of claim 1 wherein the polyamido-amine is the reaction product of an aliphatic amine and a polycarboxylic acid.

3. The adhesive composition of claim 3 wherein the polycarboxylic acid has at least two carboxyl groups and has the formula:

$$R(COOH)_n$$

wherein n is at least 2 and where R is a hydrocarbon radical which is saturated or unsaturated, aliphatic, aromatic, cycloaliphatic or heterocyclic.

4. The adhesive composition of claim 1 wherein the stoichiometry of the composition is equivalent.

5. The adhesive composition of claim 1 wherein the stoichiometry of the hardener system is equivalent.

6. A solventless, cross-linkable two-part adhesive bonding composition which cures and/or gels in the presence of water comprising a resin base portion and a filled hardener portion; said resin base portion comprising: an epoxy resinous material containing terminal epoxy groups and being essentially free from units derived from vegetable oils and aliphatic ethers derived from a polyhydric phenol and epichlorohydrin; aliphatic glycidyl ether; 2,2'-bis (4-hydroxy phenyl) propane, polystyrene resin, and said filled hardener portion comprising: the reaction product of an aliphatic polyamine and a compound selected from the group consisting of aliphatic and aromatic mono and diepoxides, mono and dihydric phenols, aldehydes, nitriles and mixtures of any of the foregoing; a polyamido amine and a finely divided solid aggregate; said epoxy resin portion and hardener portion when admixed producing an adhesive composition which is trowelable and water cleanable.

7. A solventless, cross-linkable two-part adhesive bonding composition as claimed in claim 6 which cures and/or gels in the presence of water comprising a resin base portion and a filler hardener portion; said resin base portion comprising:
77.0 weight parts of an epoxy resinous material
9.0 weight parts aliphatic monoglycidic ether
10.0 weight parts of polystyrene resin
4.0 weight parts of fumed silica
said filler hardener composition portion comprising:
21.3 weight parts amido-amine tall oil resin
8.7 weight parts modified polyamine
268.8 weight parts sand
0.9 weight parts glycerine
0.3 weight parts carbon black
said epoxy resinous material containing terminal epoxy groups derived from a polyhydric phenol and epichlorohydrin; said resin portion and hardener portion when admixed producing an adhesive composition which is water cleanable.

8. A method for preparing a solventless, cross-linkable adhesive bonding composition which cures and/or gels in the presence of water which comprises mixing a resin base portion comprising an epoxy resinous material containing terminal epoxy groups and being essentially free from units derived from vegetable oils and aliphatic ethers and a filler hardener portion comprising the combination of a modified polyamine comprised of the reaction product of an aliphatic polyamine and a compound selected from the group consisting of aliphatic and aromatic mono and diepoxides, mono and dihydric phenols, aldehydes, nitriles and mixtures of any of the foregoing; and polyamido-amine in the absence of solvent and allowing the mixture to react at room temperature to form cross-linked copolymer.

9. The method of claim 8 wherein the polyamido-amine is the reaction product of an aliphatic amine and a polycarboxylic acid.

10. The method of claim 9 wherein the polycarboxylic acid has at least two carboxyl groups and has the formula:

$$R(COOH)_n$$

wherein n is at least 2 and where R is a hydrocarbon radical which is saturated or unsaturated, aliphatic, aromatic, cycloaliphatic or heterocyclic.

11. The method of claim 8 wherein said resinous base portion and hardener portion are in stoichiometric equivalence.

12. The method of claim 8 further comprising the step of permitting the composition to cure and/or gel in the presence of water.

* * * * *

UNITED STATES PATENT AND TRADEMARK OFFICE
CERTIFICATE OF CORRECTION

PATENT NO. : 4,418,166
DATED : November 29, 1983
INVENTOR(S) : Joseph J. Chesney, Jr. et al It is certified that error appears in the above-identified patent and that said Letters Patent is hereby corrected as shown below:

Title page, section [75] Inventors, add:

-- Scott C. Broney as a co-inventor --.

Signed and Sealed this

Seventeenth Day of April 1984

[SEAL]

Attest:

GERALD J. MOSSINGHOFF

Attesting Officer

Commissioner of Patents and Trademarks